US011001304B2

(12) United States Patent
Moss et al.

(10) Patent No.: US 11,001,304 B2
(45) Date of Patent: May 11, 2021

(54) VEHICLE STRUCTURE FOR SIDE IMPACT LOAD PATH MANAGEMENT

(71) Applicant: GM GLOBAL TECHNOLOGY OPERATIONS LLC, Detroit, MI (US)

(72) Inventors: Edward D. Moss, Commerce Township, MI (US); Mark J. McGuire, Amherstburg (CA); Peter M. Parlow, Columbus, MI (US); Keith J. Saari, Macomb Township, MI (US); Mark T. Dingman, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 160 days.

(21) Appl. No.: 16/514,524

(22) Filed: Jul. 17, 2019

(65) Prior Publication Data

US 2021/0016837 A1  Jan. 21, 2021

(51) Int. Cl.
*B62D 21/15* (2006.01)
*B62D 29/00* (2006.01)
*B62D 21/03* (2006.01)

(52) U.S. Cl.
CPC .......... *B62D 21/157* (2013.01); *B62D 21/03* (2013.01); *B62D 29/008* (2013.01)

(58) Field of Classification Search
CPC ..... B62D 21/157; B62D 21/03; B62D 29/008
See application file for complete search history.

(56) References Cited

U.S. PATENT DOCUMENTS

| 2018/0065679 A1* | 3/2018 | Johnson | B62D 25/04 |
| 2018/0265136 A1* | 9/2018 | Baccouche | B60N 2/06 |
| 2019/0359260 A1* | 11/2019 | Tsuyuzaki | B60R 16/04 |

* cited by examiner

*Primary Examiner* — Lori L Lyjak
(74) *Attorney, Agent, or Firm* — Quinn IP Law

(57) ABSTRACT

A side impact load management system for a vehicle having a vehicle frame includes a plurality of cross-vehicle support members extending from a first side of the vehicle to a second side of the vehicle. A first structural member extends in a first vertical plane parallel to a vehicle body axis defined by the vehicle frame and coupled to the vehicle frame, the first structural member connecting the plurality of cross-vehicle support members on the first side of the vehicle. A second structural member extends in a second vertical plane parallel to the vehicle body axis defined by the vehicle frame and coupled to the vehicle frame, the second structural member connecting the plurality of cross-vehicle support members on the second side of the vehicle. The first and second structural members are configured to transfer a side impact load simultaneously to the plurality of cross-vehicle support members.

20 Claims, 5 Drawing Sheets

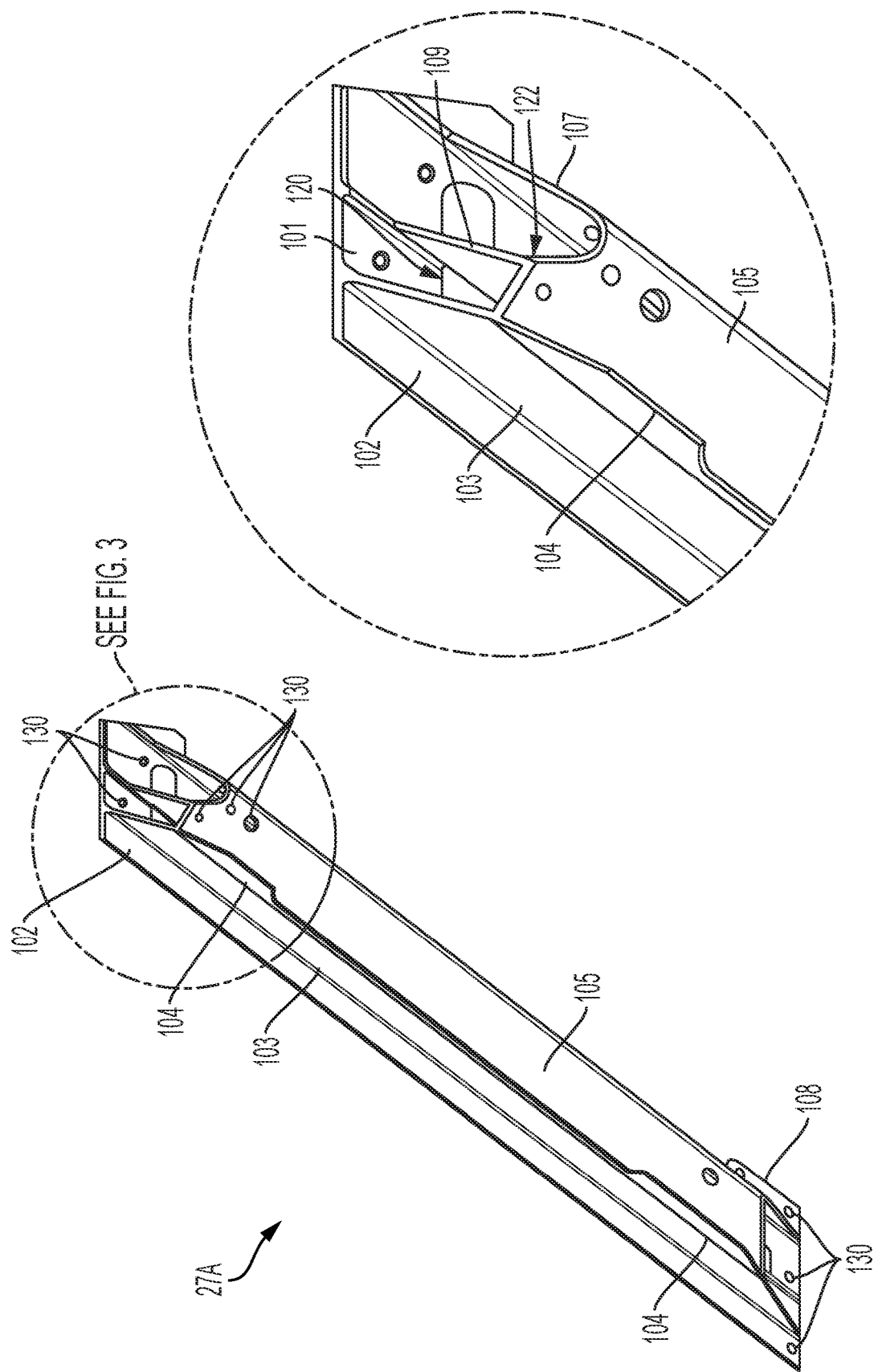

VEHICLE STRUCTURE FOR SIDE IMPACT LOAD PATH MANAGEMENT

INTRODUCTION

The present disclosure relates generally to a vehicle structure for side impact load path management for the transfer of side impact loads into three separate cross vehicle load paths.

Vehicle manufacturers use a variety of structures and components to transfer energy throughout the vehicle structure to protect the vehicle components and a vehicle's occupants during a collision. Light-duty vehicles, such as a majority of passenger cars, often employ a monocoque or unibody construction that eschews a separate body and frame, in favor of a lighter, integrated structure. Additionally, some lighter-duty vehicles employ a combination or semi-monocoque structure with a subframe for carrying the vehicle's powertrain and other components. Frequently, additional structural members are used to buttress the vehicle body structure, as well as for supporting various chassis and powertrain subsystems.

An integral frame and body construction requires more than simply attaching an unstressed body to a conventional frame. In a fully integrated body structure, the entire vehicle is a load-carrying unit that handles all the loads experienced by the vehicle, such as forces from driving and cargo. Integral-type bodies for wheeled vehicles are typically manufactured by welding preformed metal panels and other components together, by forming or casting whole sections as one piece, or by a combination of these techniques. An integral frame and body construction is generally lighter and more rigid than a vehicle having a separate body and frame.

In unibody vehicle construction, the frame, the exterior shell, and the chassis are made as a single structure, with box sections, bulkheads, and tubes providing additional rigidity, while the skin adds relatively little strength or stiffness. A true monocoque frame is basically a "skin" that supports various loads by distributing tension and compression across its surface and lacks a load-carrying internal frame. Although such a structure is sometimes also referred to as monocoque, because the vehicle's outer skin and panels are made loadbearing, there are still ribs, bulkheads and box sections to reinforce the body, making the description semi-monocoque more appropriate.

SUMMARY

Embodiments according to the present disclosure provide a number of advantages. For example, embodiments according to the present disclosure enable efficient means of management of the high compression loads of a side impact on a vehicle and the simultaneous transfer of the side impact load into multiple, cross-vehicle load paths.

In an exemplary embodiment of the present disclosure, a structural arrangement for a vehicle includes a vehicle frame including a vehicle frame rail and a center tunnel defining a vehicle body axis. The structural arrangement includes a bulkhead transverse to the vehicle body axis, the bulkhead coupled to the center tunnel. The structural arrangement also includes a plurality of cross-vehicle support members extending from a first side of the vehicle to a second side of the vehicle opposite the first side of the vehicle, the plurality of cross-vehicle support members coupled to the bulkhead. The structural arrangement also includes a structural member extending in a first vertical plane parallel to the vehicle body axis and coupled to the vehicle frame rail, the structural member connecting the plurality of cross-vehicle support members on the first side of the vehicle. The structural member is configured to transfer a side impact load simultaneously to the plurality of cross-vehicle support members.

In some aspects, the vehicle frame rail includes a first frame rail and a second frame rail spaced apart from and parallel to the first frame rail and each of the first and second frame rails extend parallel to the vehicle body axis.

In some aspects, the structural member includes a first structural member coupled to the first frame rail and a second structural member coupled to the second frame rail, the first structural member extending in the first vertical plane parallel to the vehicle body axis and the second structural member extending in a second vertical plane parallel to the vehicle body axis and parallel to the first vertical plane, the first structural member connecting the plurality of cross-vehicle support members on the first side of the vehicle and the second structural member connecting the plurality of cross-vehicle support members on the second side of the vehicle.

In some aspects, each of the first and second structural members is an extruded aluminum tubular member.

In some aspects, the bulkhead forms a first angle with the first and second frame rails and the first structural member is positioned at the first angle with the first frame rail and the second structural member is positioned at the first angle with the second frame rail.

In some aspects, the second structural member is a mirror image of the first structural member and the first and second structural members are positioned equidistant from the vehicle body axis.

In some aspects, the plurality of cross-vehicle support members includes a first cross-vehicle support member, a second cross-vehicle support member parallel to the first cross-vehicle support member, and a third cross-vehicle support member parallel to each of the first and second cross-vehicle support members, the first, second, and third cross-vehicle support members forming a tiered structure connecting the first side of the vehicle with the second side of the vehicle.

In some aspects, each of the first, second, and third cross-vehicle support members is an extruded aluminum tubular member.

In some aspects, the center tunnel is a closed section center tunnel.

In an exemplary embodiment of the present disclosure, an automotive vehicle includes a vehicle body structure having a center tunnel defining a vehicle body axis and a vehicle frame rail parallel to the vehicle body axis and a load transfer system. The load transfer system includes a plurality of cross-vehicle support members including a first cross-vehicle support member, a second cross-vehicle support member, and a third cross-vehicle support member. Each of the first, second, and third cross-vehicle support members is transverse to the vehicle body axis and extends from a first side of the vehicle to a second side of the vehicle opposite the first side. The load transfer system also includes a structural member extending in a first vertical plane parallel to the vehicle body axis and coupled to the vehicle frame rail, the structural member connecting the plurality of cross-vehicle support members on the first side of the vehicle.

In some aspects, the first cross-vehicle support member defines a first load path between the first side of the vehicle to the second side of the vehicle, the second cross-vehicle support member defines a second load path between the first side of the vehicle to the second side of the vehicle, and the third cross-vehicle support member defines a third load path between the first side of the vehicle to the second side of the vehicle.

In some aspects, the vehicle frame rail includes a first frame rail and a second frame rail spaced apart from and parallel to the first frame rail and each of the first and second frame rails extend parallel to the vehicle body axis.

In some aspects, the structural member includes a first structural member coupled to the first frame rail and a second structural member coupled to the second frame rail, the second structural member extending in a second vertical plane parallel to the vehicle body axis and parallel to the first vertical plane, the first structural member connects the plurality of cross-vehicle support members on the first side of the vehicle, and the second structural member connects the plurality of cross-vehicle support members on the second side of the vehicle.

In some aspects, the center tunnel is a closed section center tunnel and each of the plurality of cross-vehicle support members is an extruded aluminum tubular member.

In some aspects, the structural member is an extruded aluminum tubular member.

In an exemplary embodiment of the present disclosure, a side impact load management system for a vehicle having a vehicle frame includes a plurality of cross-vehicle support members extending from a first side of the vehicle to a second side of the vehicle opposite the first side of the vehicle, a first structural member extending in a first vertical plane parallel to a vehicle body axis defined by the vehicle frame and coupled to the vehicle frame, the first structural member connecting the plurality of cross-vehicle support members on the first side of the vehicle, and a second structural member extending in a second vertical plane parallel to the vehicle body axis defined by the vehicle frame and coupled to the vehicle frame, the second structural member connecting the plurality of cross-vehicle support members on the second side of the vehicle. The first and second structural members are configured to transfer a side impact load simultaneously to the plurality of cross-vehicle support members.

In some aspects, each of the first and second structural members is an extruded aluminum tubular member.

In some aspects, the first structural member is aligned at a first angle with the vehicle frame and the second structural member is aligned at the first angle with the vehicle frame such that the second structural member is a mirror image of the first structural member.

In some aspects, the plurality of cross-vehicle support members includes a first cross-vehicle support member, a second cross-vehicle support member parallel to the first cross-vehicle support member, and a third cross-vehicle support member parallel to each of the first and second cross-vehicle support members, the first, second, and third cross-vehicle support members forming a tiered structure connecting the first side of the vehicle with the second side of the vehicle.

In some aspects, each of the first, second, and third cross-vehicle support members is an extruded aluminum tubular member.

BRIEF DESCRIPTION OF THE DRAWINGS

The present disclosure will be described in conjunction with the following figures, wherein like numerals denote like elements.

FIG. 2 is a schematic perspective view of a side vehicle structural member, according to an embodiment.

FIG. 3 is a detail view of one end of the side vehicle structural member of FIG. 2, according to an embodiment.

Figure 1:
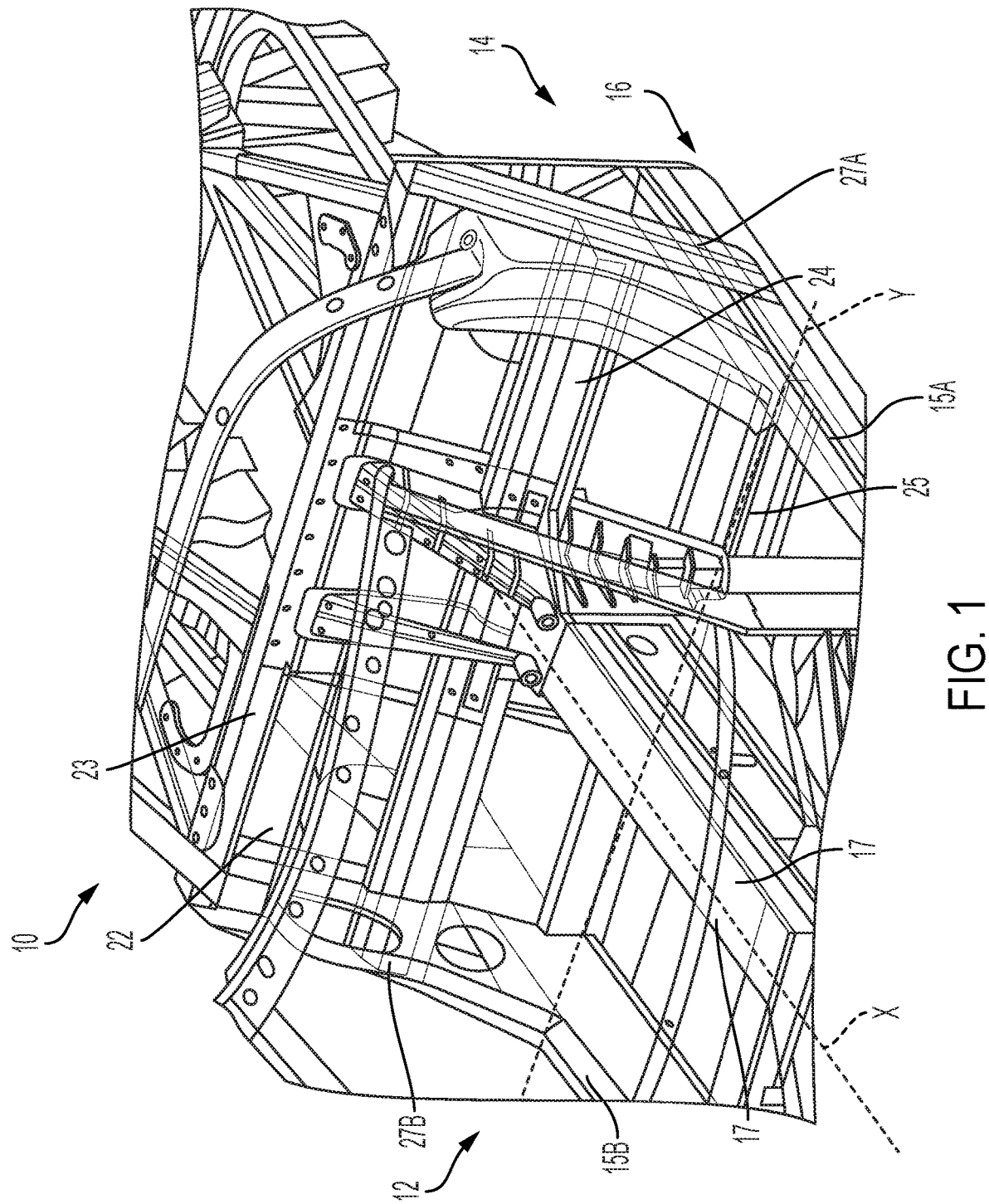
FIG. 1 is a schematic front perspective partial view of an integrated vehicle body structure illustrating members of a cross vehicle structural load path management system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring to the drawings, wherein like reference numbers refer to like components, FIG. 1 is a perspective schematic partial view of a vehicle 10 having a vehicle body structure 12. The vehicle body structure 12 is made up of a vehicle body 14 constructed from a number of components, such as exterior body panels (not shown), sub-structures, and a frame 16. The vehicle body 14 is characterized by a longitudinal vehicle centerline or vehicle body axis that generally coincides with an X-axis and is orthogonal to a Y-axis.

The vehicle body 14 is attached to a frame 16, thus enabling a support structure for a vehicle suspension and wheels (not shown), while also supporting vehicle subsystems, such as a steering system, a powertrain, passengers, and cargo (not shown). As shown in FIG. 1, the frame 16 is arranged in the general plane of the vehicle 10, substantially defined by the X and Y axes. As appreciated by those skilled in the art, the disclosed vehicle body structure 12 may be used in a rear-wheel drive, a front-wheel drive, or a four-wheel drive configuration.

With continued reference to FIG. 1, the frame 16 includes a first side frame rail 15A and a second side frame rail 15B. The side frame rails 15A and 15B may be substantially parallel with respect to each other, e.g., within +/−5° of true parallel, and arranged substantially along the vehicle body axis. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add a relatively little strength or stiffness. Similar to the unibody structure, a semi-monocoque construction is an integrated structure employs ribs, bulkheads, and box sections to reinforce the vehicle body, while the outer body panels bear a smaller portion of the structural load.

The first and second side frame rails 15A, 15B are arranged substantially symmetrically with respect to the longitudinal vehicle centerline or the X-axis. As used herein, the term "substantially symmetrically" may denote a positioning of specified components that is within +/−5 cm of true symmetry with respect to the longitudinal vehicle centerline. The first and second side frame rails 15A, 15B may be constructed from aluminum and be formed by one or more appropriate methods, such as extrusion, hydroforming, roll-forming, stamping, and welding.

With continued reference to FIG. 1, the vehicle body structure 12 includes a closed section center tunnel 17. The center tunnel 17 extends substantially along and defines the longitudinal vehicle centerline illustrated by the X-axis and connects the forward section of the vehicle 10 with the rear section of the vehicle 10.

As may be seen in FIG. 1, the vehicle body structure 12 also includes a bulkhead 22. The bulkhead 22 is arranged at a first angle to the side frame rails 15A and 15B and the center tunnel 17. The first angle formed by the bulkhead 22 and the side frame rails 15A, 15B depends on the vehicle configuration including, in some embodiments, the rearward reclined position of the bulkhead 22 and/or the rear seat back in the passenger compartment of the vehicle 10. In various embodiments, the first angle is less than 90 degrees when measured from the rear of the bulkhead 22 to either or both of the side frame rails 15A, 15B. The bulkhead 22 is coupled to both the side frame rails 15A, 15B and the center tunnel 17 by welding or any other mechanical fastening method. The bulkhead 22 is arranged transverse to the vehicle body axis X and may be configured as a load-bearing component connecting the side frame rails 15A and 15B in either a unibody or a semi-monocoque construction.

A plurality of cross-vehicle support members 23, 24, 25 extend transverse to the longitudinal vehicle centerline indicated by the X-axis. As shown in FIG. 1, the cross-vehicle support members 23, 24, 25 are vertically separated from one another and define three separate cross vehicle load paths to distribute side impact loads. In various embodiments, one or more of the cross-vehicle support members 23, 24, 25 are coupled to the bulkhead 22. In various embodiments, the cross-vehicle support members 23, 24, 25 extend the width of the vehicle 10. In some embodiments, the cross-vehicle support members 23, 24, 25 are extruded aluminum tubular members with a generally rectangular cross-section and a three-cell structure.

To effectively manage cross vehicle loads for two-door vehicles, it is preferable to have sufficient cross-vehicle members to manage the high compression loads, as well as a structural member to ensure the cross-vehicle members are loaded simultaneously. As shown in FIG. 1, and with continued reference to FIGS. 2-6, a pair of side vehicle structural members 27A, 27B extend in vertical planes on each side of the vehicle 10 and connect each end of the cross-vehicle support members 23, 24, 25. The side vehicle structural members 27A, 27B are positioned equidistant from the vehicle body axis X. Each of the side vehicle structural members 27A, 27B is angled to effectively transfer side impact loads across the vehicle 10 through the three, tiered cross-vehicle support members 23, 24, 25, minimizing detrimental deformation of the vehicle body structure 12. The angle of each of the side vehicle structural members 27A, 27B depends on the vehicle configuration including, in some embodiments, the orientation and rearward inclined angle of the rear seat back of the vehicle 10 and/or the rearward inclined angle of the bulkhead 22 and, correspondingly, the angle formed by the plane containing the three cross-vehicle support members 23, 24, 25 with respect to the first and second side frame rails 15A, 15B. In various embodiments, each of the side structural members 27A, 27B is an extruded aluminum tubular member.

The structural members 27A, 27B are positioned in vertical planes on each side of the vehicle 10 at an angle that provides overlap with each of the three cross-vehicle support members 23, 24, 25 to allow for simultaneous loading of each member during a side impact event. Synchronous loading of the cross-vehicle support member 23, 24, 25 reduces eccentricity of movement of the cross-vehicle support members 23, 24, 25 during the load event, increasing the compressive load capacity of the vehicle frame 16 and reducing overall mass of the vehicle 10.

Figure 4:
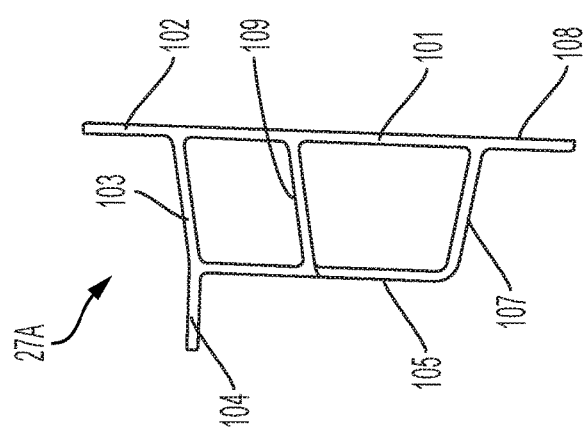
FIG. 4 is a cross-sectional view of the side vehicle structural member of FIG. 2, according to an embodiment.

With reference to FIGS. 2-4, the side vehicle structural member 27A is illustrated in full (FIG. 2), in detail at a first end (FIG. 3), and in cross-section (FIG. 4). It should be understood that the side vehicle structural member 27B is a similar mirror image of the side vehicle structural member 27A in order to conform with the structural arrangement on the opposite side of the vehicle 10.

In various embodiments, the side vehicle structural member 27A is a two-cell, high strength aluminum tubular extrusion having a generally rectangular cross-section. The structural member 27A includes a first wall 101. The first wall 101 defines a vertical plane extending orthogonal to the Y-axis or cross-vehicle axis of the vehicle 10. The structural member 27A includes a first mounting flange 102 extending from and planar with the first wall 101. The first mounting flange 102 is exterior of a second wall 103 of the structural member 27A. The second wall 103 is substantially orthogonal to the first wall 101. A second mounting flange 104 extends from and is planar with the second wall 103. In various embodiments, the second mounting flange 104 extends at least part of the length of the second wall 103.

A third wall 105 is orthogonal to the second wall 103 and defines a separate, parallel plane from the plane defined by the first wall 101. The third wall 105 is connected to the first wall 101 by the second wall 103, a fourth wall 107, and an interior wall 109. The interior wall 109 is substantially parallel to the second wall 103 and/or the fourth wall 107. The first, second, third, and interior walls 101, 103, 105 and 109 define a first tubular opening 120. The first, third, fourth, and interior walls 101, 105, 107, and 109 define a second tubular opening 122 that extends parallel to the first tubular opening 120.

In various embodiments, at a second end of the structural member 27A opposite the first end shown in FIG. 3, a third mounting flange 108 extends in the same plane as the first wall 101 and extends in an opposite direction from the first mounting flange 102.

A plurality of openings 130 are defined in the first wall 101. The openings may be distributed throughout the structural member 27A but as shown extend through the first wall 101 at the first and second ends of the structural member 27A. In various embodiments, additional openings 130 extend through the third wall 105. Each of the openings 130 shown in FIGS. 2 and 3 (and other openings not shown in the figures) are configured to receive a mechanical fastener, such as a bolt, screw, or rivet. In various embodiments, the number and placement of the openings and the fasteners may be selected based on the surrounding vehicle frame geometry.

Figure 5:
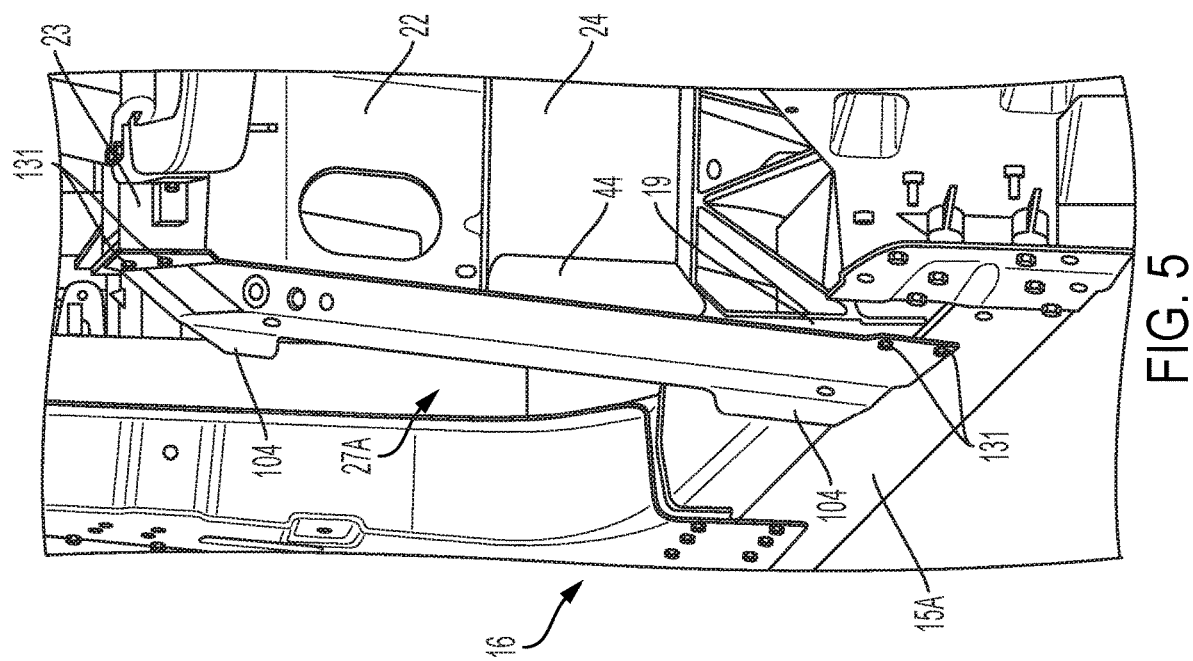
FIG. 5 is a schematic rear perspective partial view of the integrated vehicle body structure illustrating members of the cross vehicle structural load path management system, according to an embodiment.
Figure 6:
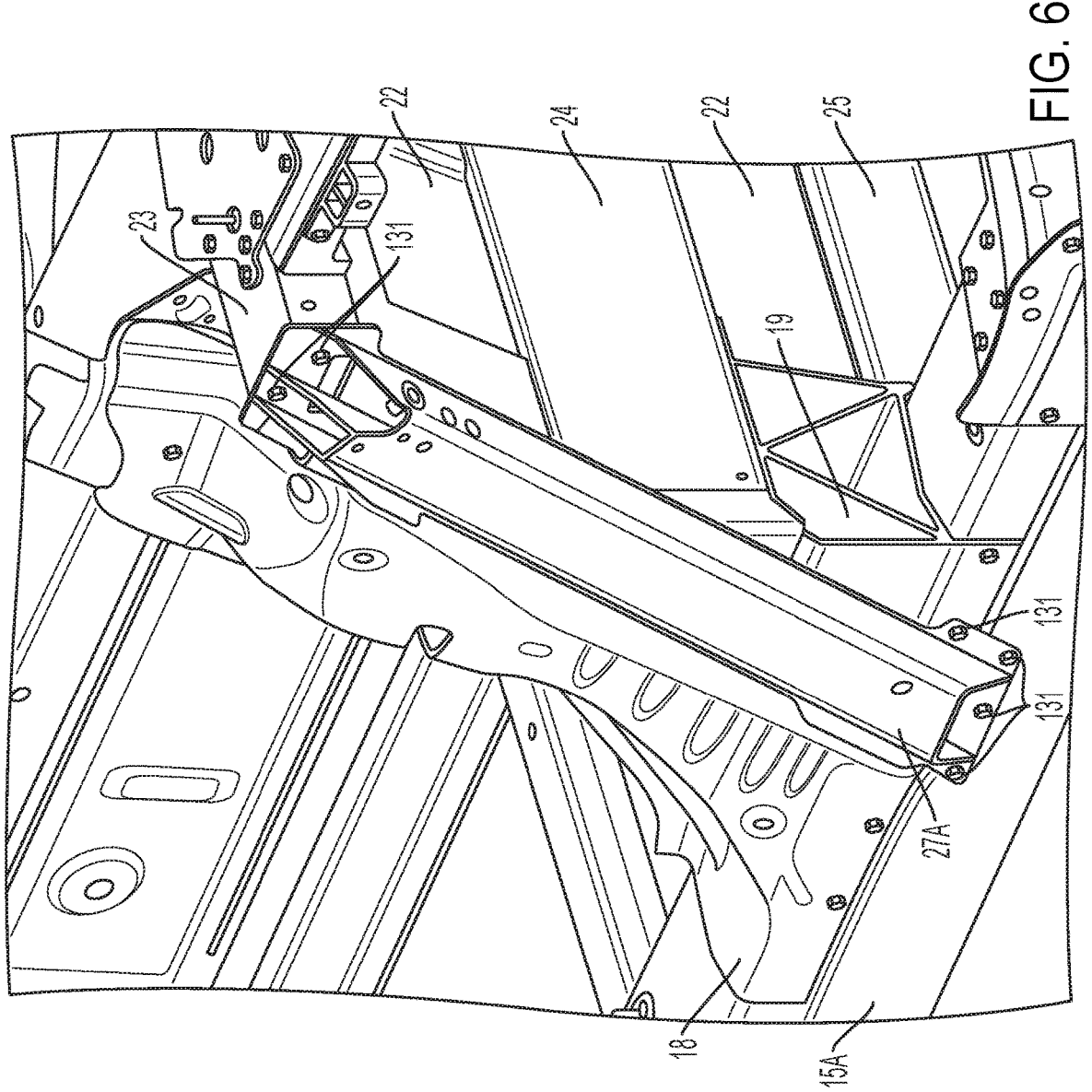
FIG. 6 is a schematic side perspective partial view of the integrated vehicle body structure illustrating members of a cross vehicle structural load path management system, according to an embodiment.
Figure 7:
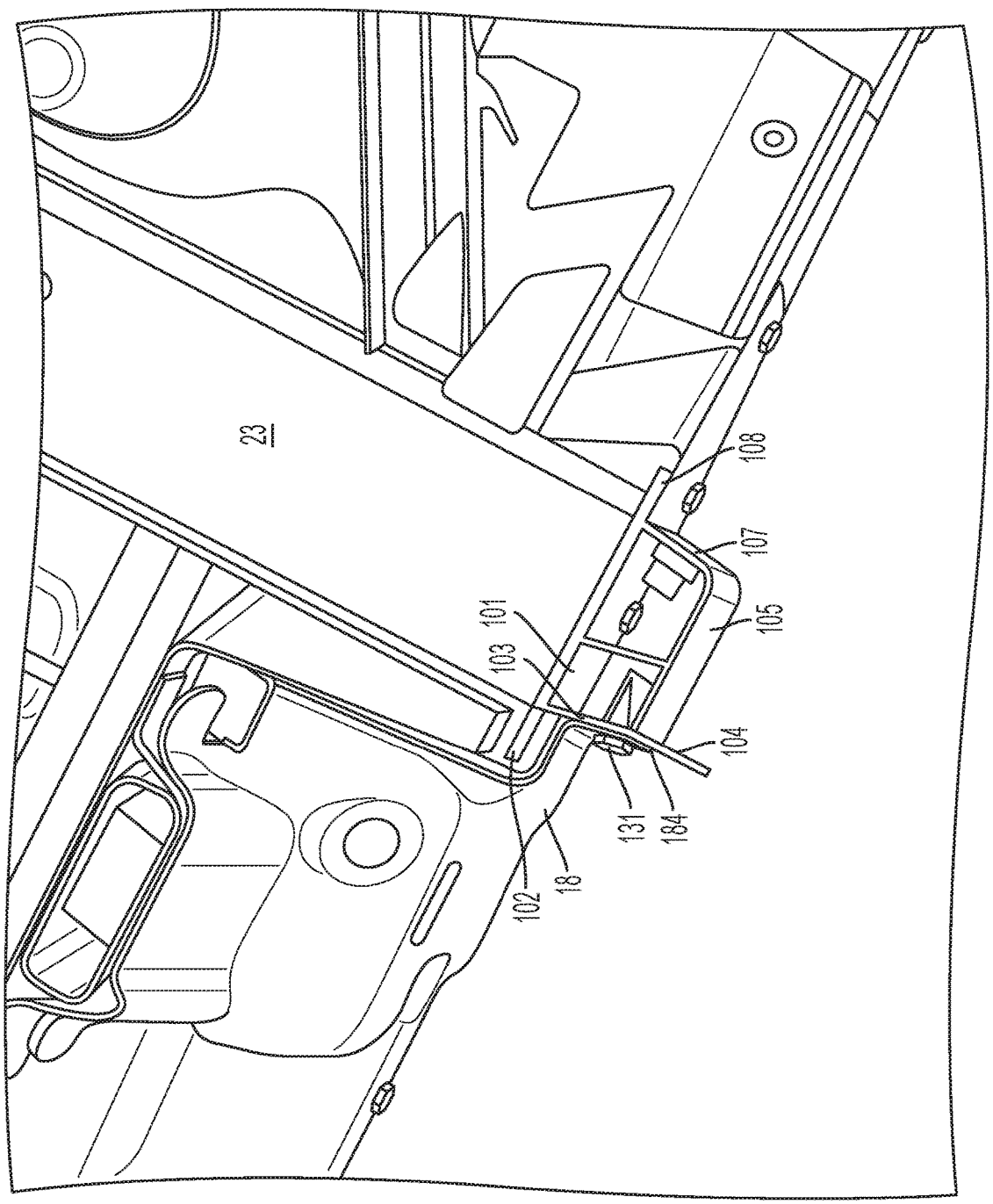
FIG. 7 is a schematic top view of the integrated vehicle body structure illustrating members of a cross vehicle structural load path management system, according to an embodiment.

With reference now to FIGS. 5-7, the structural member 27A is shown coupled to the vehicle frame 16. Specifically, the structural member 27A is coupled outward of the three, tiered cross-vehicle support members 23, 24, 25. A plurality of fasteners 131 extends through the openings 130 in the structural member 27A to couple the second end of the structural member 27A to the first side frame rail 15A. Another plurality of fasteners 131 extends through the openings 130 in the structural member 27A to couple the first end of the structural member 27A to the first cross-vehicle support member 23.

In some embodiments, an intermediate coupling member 44 is sandwiched between the structural member 27A and the second cross-vehicle support member 24, as shown in FIG. 4. Additionally, in some embodiments, the vehicle body structure 12 includes a truss support member 19 positioned adjacent to and coupled to the first side frame rail 15A. The truss support member 19 may be further coupled to the third cross-vehicle support member 25 to provide an indirect link between the structural member 27A and the third cross-vehicle support member 25, as shown in FIG. 6.

In various embodiments, as best shown in FIG. 7, the flanges of the structural member 27A interface with the surrounding vehicle frame 16 members to securely couple and integrate the structural member 27A with the vehicle body structure 12. In various embodiments, an adhesive, such as an epoxy is used, in addition to one or more fasteners 131 to couple the structural member 27A to the surround vehicle frame 16 members. A frame support member 18 includes two approximately 90-degree bends that terminate in an attachment flange 184. The first mounting flange 102 of the structural member 27A is positioned behind (that is, inward of) the frame support member 18 such that the attachment flange 184 is positioned adjacent to the second mounting flange 104. At least one fastener 131 extends through both the attachment flange 184 and the second mounting flange 104 to couple together the frame support member 18 and the structural member 27A.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A structural arrangement for a vehicle, comprising:
a vehicle frame including a vehicle frame rail and a center tunnel defining a vehicle body axis;
a bulkhead transverse to the vehicle body axis, the bulkhead coupled to the center tunnel;
a plurality of cross-vehicle support members extending from a first side of the vehicle to a second side of the vehicle opposite the first side of the vehicle, the plurality of cross-vehicle support members coupled to the bulkhead; and
a structural member extending in a first vertical plane parallel to the vehicle body axis and coupled to the vehicle frame rail, the structural member connecting the plurality of cross-vehicle support members on the first side of the vehicle;
wherein the structural member is configured to transfer a side impact load simultaneously to the plurality of cross-vehicle support members.

2. The structural arrangement for the vehicle of claim 1, wherein the vehicle frame rail includes a first frame rail and a second frame rail spaced apart from and parallel to the first frame rail and each of the first and second frame rails extend parallel to the vehicle body axis.

3. The structural arrangement for the vehicle of claim 2, wherein the structural member includes a first structural member coupled to the first frame rail and a second structural member coupled to the second frame rail, the first structural member extending in the first vertical plane parallel to the vehicle body axis and the second structural member extending in a second vertical plane parallel to the vehicle body axis and parallel to the first vertical plane, the first structural member connecting the plurality of cross-vehicle support members on the first side of the vehicle and the second structural member connecting the plurality of cross-vehicle support members on the second side of the vehicle.

4. The structural arrangement for the vehicle of claim 3, wherein each of the first and second structural members is an extruded aluminum tubular member.

5. The structural arrangement for the vehicle of claim 3, wherein the bulkhead forms a first angle with the first and second frame rails and the first structural member is positioned at the first angle with the first frame rail and the second structural member is positioned at the first angle with the second frame rail.

6. The structural arrangement for the vehicle of claim 5, wherein the second structural member is a mirror image of the first structural member and the first and second structural members are positioned equidistant from the vehicle body axis.

7. The structural arrangement for the vehicle of claim 3, wherein the plurality of cross-vehicle support members includes a first cross-vehicle support member, a second cross-vehicle support member parallel to the first cross-vehicle support member, and a third cross-vehicle support member parallel to each of the first and second cross-vehicle support members, the first, second, and third cross-vehicle support members forming a tiered structure connecting the first side of the vehicle with the second side of the vehicle.

8. The structural arrangement for the vehicle of claim 7, wherein each of the first, second, and third cross-vehicle support members is an extruded aluminum tubular member.

9. The structural arrangement for the vehicle of claim 1, wherein the center tunnel is a closed section center tunnel.

10. An automotive vehicle, comprising:
a vehicle body structure having a center tunnel defining a vehicle body axis and a vehicle frame rail parallel to the vehicle body axis; and
a load transfer system including:
a plurality of cross-vehicle support members including a first cross-vehicle support member, a second cross-vehicle support member, and a third cross-vehicle support member, each of the first, second, and third cross-vehicle support members being transverse to the vehicle body axis and extending from a first side of the vehicle to a second side of the vehicle opposite the first side; and
a structural member extending in a first vertical plane parallel to the vehicle body axis and coupled to the vehicle frame rail, the structural member connecting the plurality of cross-vehicle support members on the first side of the vehicle.

11. The automotive vehicle of claim 10, wherein the first cross-vehicle support member defines a first load path between the first side of the vehicle to the second side of the vehicle, the second cross-vehicle support member defines a second load path between the first side of the vehicle to the second side of the vehicle, and the third cross-vehicle support member defines a third load path between the first side of the vehicle to the second side of the vehicle.

12. The automotive vehicle of claim 10, wherein the vehicle frame rail includes a first frame rail and a second frame rail spaced apart from and parallel to the first frame rail and each of the first and second frame rails extend parallel to the vehicle body axis.

13. The automotive vehicle of claim 12, wherein the structural member includes a first structural member coupled to the first frame rail and a second structural member coupled to the second frame rail, the second structural member extending in a second vertical plane parallel to the vehicle body axis and parallel to the first vertical plane, the first structural member connects the plurality of cross-vehicle support members on the first side of the vehicle, and the second structural member connects the plurality of cross-vehicle support members on the second side of the vehicle.

14. The automotive vehicle of claim 10, wherein the center tunnel is a closed section center tunnel and each of the plurality of cross-vehicle support members is an extruded aluminum tubular member.

15. The automotive vehicle of claim 10, wherein the structural member is an extruded aluminum tubular member.

16. A side impact load management system for a vehicle having a vehicle frame, the system comprising:
- a plurality of cross-vehicle support members extending from a first side of the vehicle to a second side of the vehicle opposite the first side of the vehicle;
- a first structural member extending in a first vertical plane parallel to a vehicle body axis defined by the vehicle frame and coupled to the vehicle frame, the first structural member connecting the plurality of cross-vehicle support members on the first side of the vehicle; and
- a second structural member extending in a second vertical plane parallel to the vehicle body axis defined by the vehicle frame and coupled to the vehicle frame, the second structural member connecting the plurality of cross-vehicle support members on the second side of the vehicle;
- wherein the first and second structural members are configured to transfer a side impact load simultaneously to the plurality of cross-vehicle support members.

17. The side impact load management system of claim 16, wherein each of the first and second structural members is an extruded aluminum tubular member.

18. The side impact load management system of claim 16, wherein the first structural member is aligned at a first angle with the vehicle frame and the second structural member is aligned at the first angle with the vehicle frame such that the second structural member is a mirror image of the first structural member.

19. The side impact load management system of claim 16, wherein the plurality of cross-vehicle support members includes a first cross-vehicle support member, a second cross-vehicle support member parallel to the first cross-vehicle support member, and a third cross-vehicle support member parallel to each of the first and second cross-vehicle support members, the first, second, and third cross-vehicle support members forming a tiered structure connecting the first side of the vehicle with the second side of the vehicle.

20. The side impact load management system of claim 19, wherein each of the first, second, and third cross-vehicle support members is an extruded aluminum tubular member.

* * * * *